(12) United States Patent
Garbuglia et al.

(10) Patent No.: US 10,294,978 B2
(45) Date of Patent: May 21, 2019

(54) LOCKING PIN

(71) Applicant: ANSALDO ENERGIA SWITZERLAND AG, Baden (CH)

(72) Inventors: Francesco Garbuglia, Nussbaumen (IT); Marc Widmer, Winterthur (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 355 days.

(21) Appl. No.: 15/217,281

(22) Filed: Jul. 22, 2016

(65) Prior Publication Data
US 2017/0023050 A1  Jan. 26, 2017

(30) Foreign Application Priority Data

Jul. 24, 2015 (DE) .................... 20 2015 005 177 U

(51) Int. Cl.
*F16B 41/00* (2006.01)
*F01D 25/24* (2006.01)
(Continued)

(52) U.S. Cl.
CPC .......... *F16B 41/002* (2013.01); *F01D 25/246* (2013.01); *F16B 35/041* (2013.01);
(Continued)

(58) Field of Classification Search
CPC ............... F01D 25/246; F05D 2260/30; F05D 2260/38; F16B 35/041; F16B 41/002
See application file for complete search history.

(56) References Cited

U.S. PATENT DOCUMENTS 2,353,248 A * 7/1944 Lamb .................... B25B 31/005
269/48.2
2,907,418 A * 10/1959 Hudson ................. F16B 5/0208
403/21
(Continued)

FOREIGN PATENT DOCUMENTS

DE       40 24 368 A1    2/1992
DE       19801159 A1     7/1999
(Continued)

OTHER PUBLICATIONS

German Search Report dated Apr. 26, 2016 for Application No. 20 2015 005 177.4.
(Continued)

*Primary Examiner* — Matthieu F Setliff
(74) *Attorney, Agent, or Firm* — Buchanan Ingersoll & Rooney PC

(57) ABSTRACT

A locking pin arrangement with a basic element for receiving an insert and a fall-proof locking pin for fixing the insert in the basic element. The locking pin is at least partially inserted into a borehole of the basic element and is pushed towards an opening of the borehole by a spring. The locking pin has a guiding surface for axial guidance in the borehole, an outer thread and a constriction positioned between the outer thread and the guiding surface, wherein the diameter of the outer thread is smaller than the diameter of the guiding surface and the diameter of the locking pin at the constriction is smaller than the diameter of the outer thread. Further, the arrangement comprises an inner thread going from the wall of the borehole into the space formed by the constriction.

5 Claims, 1 Drawing Sheet

(51) Int. Cl.
*F16B 35/04* (2006.01)
*E05C 1/02* (2006.01)

(52) U.S. Cl.
CPC ............ *E05C 1/02* (2013.01); *F05D 2230/64* (2013.01); *F05D 2260/30* (2013.01); *F05D 2260/38* (2013.01)

(56) References Cited

U.S. PATENT DOCUMENTS

| | | | |
|---|---|---|---|
| 2,992,685 A * | 7/1961 | Madsen | B64C 1/06 269/47 |
| 3,996,651 A * | 12/1976 | Heaton | B23B 27/1662 407/104 |
| 6,022,009 A * | 2/2000 | Hill | B23Q 1/032 269/289 R |
| 6,264,186 B1 * | 7/2001 | Hill | B23Q 1/032 269/289 R |
| 6,276,865 B1 | 8/2001 | Korzan et al. | |
| 6,296,431 B1 * | 10/2001 | Miller | F16B 5/0208 411/107 |
| 8,770,902 B1 * | 7/2014 | Miller | F16B 5/0208 29/451 |
| 9,546,000 B2 * | 1/2017 | Shih | B64D 11/0696 |
| 2003/0029285 A1 | 2/2003 | Wirth, Jr. et al. | |
| 2014/0014792 A1 | 1/2014 | Willis et al. | |
| 2016/0251082 A1 * | 9/2016 | Shih | B64D 11/0696 248/636 |

FOREIGN PATENT DOCUMENTS

DE 10315690 A1 11/2004
DE 102005052106 A1 5/2006

OTHER PUBLICATIONS

Extended European Search Report dated Nov. 28, 2016, issued by the European Patent Office in corresponding European Application No. EP 16180900.9 (7 pages).

* cited by examiner

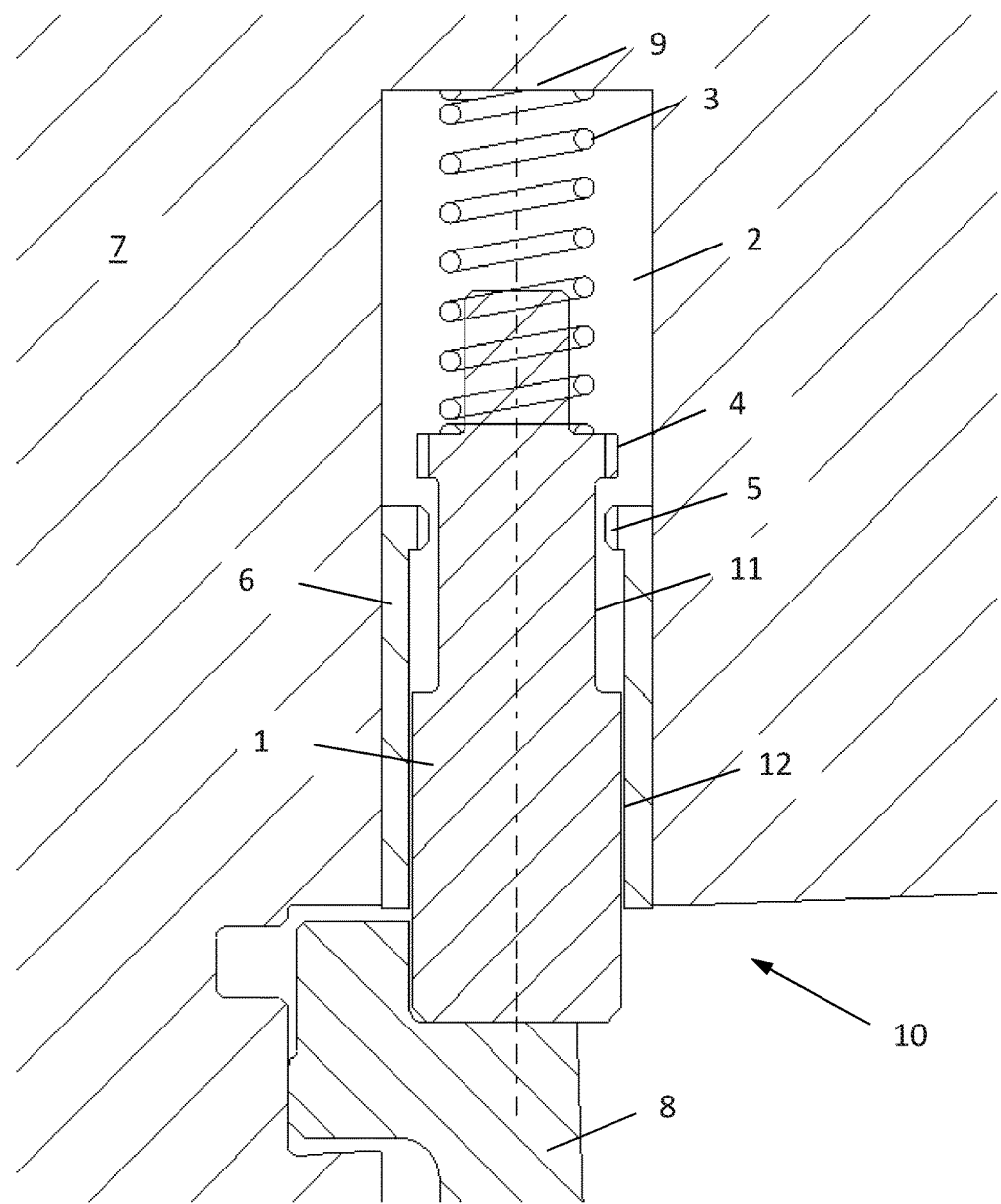

LOCKING PIN

TECHNICAL FIELD

This invention relates to the field of locking pin arrangements. It relates to an arrangement comprising a pin-guiding component and a locking pin positioned in a guide opening of the component so that it is axially movable between a locking position and an opening position.

STATE OF THE ART

Locking pin arrangements with a basic element for receiving an insert that is held in place by a locking pin in the basic element are known from the state of the art. In doing so, the locking pin is partially inserted into a borehole of the basic element and pushed towards the opening of the borehole by a spring positioned between a first end of the locking pin and a bearing surface. Thereby, a second end of the locking pin is designed to fix the insert. This second end is pressed from the borehole onto the insert by spring pressure, the insert being held in place by the locking pin. As soon as the insert is removed, there is the risk that the locking pin is pressed out of the borehole and falls down uncontrollably. Especially where locking pins are positioned in machines that are difficult to access, such as a gas turbine or steam turbine, a loss of components such as a locking pin must be avoided.

Bayonet locks, locking wires or external locks are known from the state of the art. They increase the complexity of the arrangement and assembly or require boreholes passing through the basic element and can lead to sealing problems.

DESCRIPTION OF THE INVENTION

The scope of the disclosure is to provide a locking pin arrangement for receiving an insert in a basic element and a locking pin for locking the insert in position in the basic element, which avoids the disadvantages of the known lock arrangement and especially safely prevents the locking pin from falling out uncontrollably. Particularly in turbo machines such as gas turbines or steam turbines, it is very difficult to access the components located on the inside when the housing is closed and the assembly or dismantling of parts is very complex. If components such as pins or screws fall into the machine, it is frequently no longer possible to continue, inspect or repair it when closed and the machine needs to be opened. This results in significant delays in time and costs.

The task is solved by the disclosed locking pin arrangement. The locking pin arrangement comprises a basic element for receiving an insert and a locking pin for fixing the insert in the basic element, wherein the locking pin is at least partially inserted into a borehole of the basic element. The locking pin is pushed towards the opening of the borehole by a spring positioned between a first end of the locking pin and a bearing surface. Thereby, a second end of the locking pin is shaped to lock the insert in place. The locking pin has a guiding surface for axial guidance in the borehole, an outer thread and a constriction positioned between the outer thread and the guiding surface, wherein the outer thread is positioned between the first end of the locking pin and the constriction. The diameter of the locking pin is smaller at the constriction than the diameter of the outer thread. The diameter of the outer thread is thus smaller than the diameter of the guiding surface. Further, the locking pin arrangement has an inner thread extending from the wall of the borehole into the space formed though the constriction. The diameter of the outer thread should be intended as the diameter of the opening defined by the thread tip.

For the assembly, the spring and the locking pin are inserted into the borehole with the first end first. The outer thread of the locking pin is turned through the inner thread into the borehole and the locking pin can be freely moved in an axial direction, wherein the locking pin is pushed outwards by the spring pressure exerted by the spring positioned between the bearing surface and the first end of the locking pin. The outer thread prevents the locking pin from falling inside when the locking pin is not pressed inwardly.

According to an embodiment of the locking pin arrangement, a cylindrical bushing for guiding the locking pin is arranged between the locking pin and the borehole. At the same time, the bushing is mechanically connected with the basic element, e.g. it can be pressed, screwed, brazed or glued into the borehole.

According to another example embodiment of the locking pin arrangement, the inner thread is part of the bushing.

According to an embodiment, the basic element is a portion of the casing or a blade carrier of the gas turbine, the portion of the casing comprising the insert and the locking pin holding the insert in a defined position in the portion of the casing.

Besides a locking pin arrangement, the disclosure refers to a turbo machine, in particular a gas turbine or a steam turbine. Such a turbo machine covers at least one embodiment of the locking pin arrangement.

BRIEF EXPLANATION OF THE FIGURES

The disclosure will be explained in more detail in the following on the basis of an exemplary embodiment together with a drawing. It shows:

FIG. 1 a simplified presentation of a section of a locking pin arrangement.

WAYS OF EXECUTING THE INVENTION

FIG. 1 illustrates a locking pin arrangement 10 comprising a basic element for receiving an insert 8 and a locking pin 1 for fixing the insert 8 in the basic element 7. The locking pin 1 is partially inserted into a borehole 2 of the basic element 7. A spring 3 is positioned between the first end of the locking pin 1 and a bearing surface 9 of the borehole implemented as a blind hole, the spring pressing the locking pin 1 towards an opening of the borehole 2, whereby a second end of the locking pin 1, that is designed to lock the insert 8, into place, holds the insert 8 in a defined position. The locking pin has a guiding surface 12 for axial guidance in the borehole. This can have, for example, the shape of a cylindrical fit. The locking pin 1 further has an outer thread 4 and a constriction 11 between the outer thread 4 and the guiding surface 12. The outer thread 4 is positioned in the direction of the first end of the locking pin. In other words, the outer thread is positioned between the first end of locking pin 1 and the constriction 11. The diameter of outer thread 4 is smaller than the diameter of the guiding surface so that the locking pin 1 can easily be inserted into borehole 2.

The embodiment of FIG. 1 is designed with a cylindrical bushing 6 that is inserted into borehole 2. The outer wall of the bushing 6 is connected to the inner wall of borehole 2 by form- and force-fit. The inner wall of the bushing forms the guiding surface 12 to guide the locking pin 1. At the side of the bushing 6 facing away from the opening of borehole 2, an inner thread 5 extends from the inner wall of the bushing 6, and reaches the space formed by the constriction 11 between the bushing 6 and the locking pin 8. The inner thread 5 and the outer thread 4 form a matching allowing the locking pin to be screwed in during assembly through the inner thread. Thereby, the locking pin is not firmly screwed against a support, but it is screwed through the inner thread until the outer threads are free again, the locking pin 1 is freely movable guided through the bushing 6 in an axial direction and is pressed by the spring 3 towards the opening of the borehole 2.

Instead of the shown locking pin arrangement 10, a locking pin arrangement 10 without a bushing is conceivable with the inner thread 5 extending from the borehole wall into the borehole 2 and the borehole wall being configured as the guiding surface 12.

LIST OF REFERENCE TERMS

1 Locking pin
2 Borehole
3 Spring
4 Outer thread
5 Inner thread
6 Bushing
7 Basic element
8 Insert
9 Bearing surface
10 Locking pin arrangement
11 Constriction
12 Guiding surface

The invention claimed is:

1. Locking pin arrangement with a basic element for receiving an insert and a locking pin for fixing the insert in the basic element, wherein the locking pin is at least partially inserted into a borehole of the basic element and is pressed towards an insertion opening of the borehole by a spring positioned between a first end of the locking pin and a bearing surface of the borehole, a second end of the locking pin being shaped for fixing the insert, wherein the locking pin has a guiding surface for axial guidance in the borehole, an outer thread and a constriction between the outer thread and the guiding surface, the outer thread being positioned between the first end of the locking pin and the constriction, the diameter of the outer thread is smaller than the diameter of the guiding surface and the diameter of the locking pin on the constriction is smaller than the diameter of the outer thread, and in that an inner thread matching the outer thread extends into the space formed by the constriction from the wall of the borehole, the inner thread arranged between the spring and the insertion opening of the borehole, a distance between an end of the outer thread proximate the insertion opening and a terminal edge of the locking pin proximate the bearing surface is smaller than a distance between the inner threads and the bearing surface.

2. Locking pin arrangement according to claim 1, wherein a cylindrical bushing is arranged between the locking pin and the borehole for guiding the locking pin, wherein the bushing is mechanically connected to the basic element.

3. Locking pin arrangement according to claim 1, wherein the inner thread is part of the bushing.

4. Casing portion or blade carrier with a locking pin arrangement according to claim 1.

5. Turbo machine with a locking pin arrangement according to claim 1.

\* \* \* \* \*